B. J. SVENSON.
Improvement in Corn and Cotton Planters.
No. 130,764. Patented Aug. 20, 1872.

Witnesses:
Jas. E. Hutchinson
C. L. Evert.

Inventor.
Bengt Johan Svenson
per Alexander Mason
Attorneys.

UNITED STATES PATENT OFFICE.

BENGT JOHAN SVENSON, OF MANOR STATION, TEXAS.

IMPROVEMENT IN CORN AND COTTON PLANTERS.

Specification forming part of Letters Patent No. 130,764, dated August 20, 1872.

*To all whom it may concern:*

Be it known that I, B. J. SVENSON, of Manor Station, in the county of Travis and in the State of Texas, have invented certain new and useful Improvements in Corn and Cotton Planters; and do hereby declare that the following is a full, clear, and exact description thereof, reference being had to the accompanying drawing and to the letters of reference marked thereon making a part of this specification.

The nature of my invention consists in the construction and arrangement of a "corn and cotton planter," as will be hereinafter more fully set forth.

In order to enable others skilled in the art to which my invention appertains to make and use the same, I will now proceed to describe its construction and operation, referring to the annexed drawing, in which—

Figure 1:
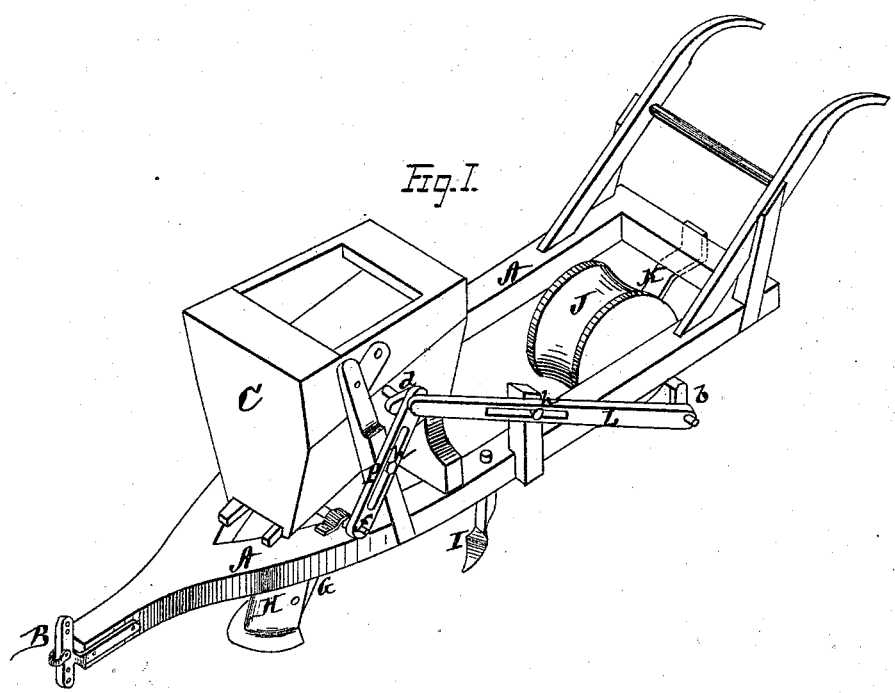
Figure 2:
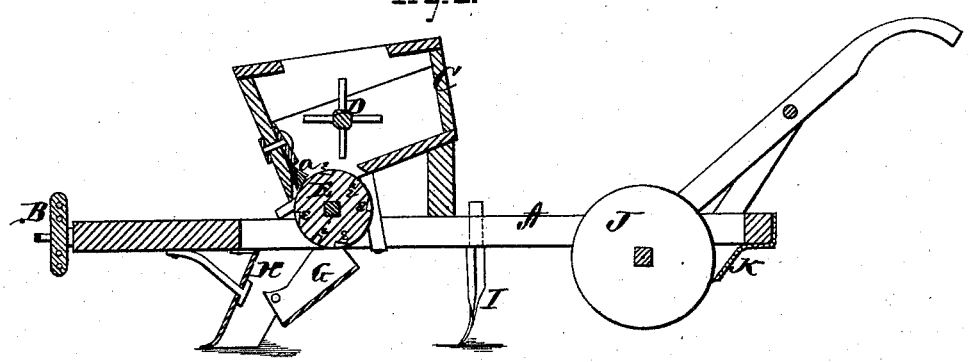

Figure 1 is a perspective view, and Fig. 2 a longitudinal vertical section, of my machine.

A represents the frame, constructed substantially in the form shown in Fig. 1, with a graduating clevis, B, attached at its front end for the purpose of regulating deep or shallow plowing. C is the seed-box, arranged, as shown, upon the frame A, and provided with a shaft placed horizontally through the sides of the box. This shaft is provided with a series of arms, and forming a revolving feeder or agitator, D, to assist in passing seeds to the cups in the revolving planting-wheel E. This wheel is placed in the lower front part of the seed-box C on a shaft or axle, which rests in boxes on the frame A. This wheel E is in its circumference provided with cups $i\ i$ and $e\ e$ to receive the seed, and carry the same around to the lower side where it is to be deposited. The larger cups or holes $e\ e$ are for cotton, and the smaller (round) cups $i\ i$ for corn; pieces fitting and filling the cotton-cups are screwed into them when planting corn, and vice versa. At the front part of the aperture in the bottom of the box C is a brush, $a$, which rests upon the surface of the planter E, and brushes back all surplus seeds from the cups, leaving three or four grains of corn, or eight to ten cotton-seeds in the cup. The seed which are received into and dropped by the cups in the planter E, fall into a funnel, G, through which they pass to the drill. The front of this funnel or conductor is formed by the shank of the drill-plow H, which shank is semi-tubular or concave on its rear side, and attached to the under side of the frame A, and suitably braced. In rear of the planting-wheel E and on each side of the frame is a covering-plow, I. In the rear part of the frame A is mounted a roller, J, the circumference of which is concave. This roller packs the earth over the planted corn or cotton, and at the same time furnishes the motive-power for the agitator D and planter E. In rear of this roller is a scraper, K, to prevent clogging of the same.

Motion is communicated from the roller J to the agitator and planter by the following means: Upon one end of the shaft or axle of the roller J is a crank, $b$, which by a lever or pitman, L, is connected with a crank, $d$, upon one end of the agitator-shaft or axle. This crank $d$ is by a similar lever or pitman, P, connected with a crank, $f$, on the planter-shaft or axle. The two levers or pitmen L and P are both slotted longitudinally, and a headed pin or screw, $h$, passes through each into parts of the frame. By this arrangement the agitator and planter receive the required rotating motion. A portion of the side of the box C immediately above the agitator-shaft may be made movable, so that the agitator can be removed when desired.

Having thus fully described my invention, what I claim as new, and desire to secure by Letters Patent, is—

The combination of the concave driving-roller J with crank $b$, slotted levers or pitmen L P, with headed screws or pins $h\ h$, and cranks $d\ f$, formed respectively upon the journals of the agitator and planting-wheel, substantially as and for the purposes herein set forth.

In testimony that I claim the foregoing I have hereunto set my hand this 23d day of May, 1872.

BENGT JOHAN SVENSON.

Witnesses:
J. W. HOWARD,
S. W. PALM.